United States Patent
Rybczynski (10) Patent No.: US 6,348,953 B1
(45) Date of Patent: Feb. 19, 2002

(54) DEVICE AND PROCESS FOR PRODUCING A COMPOSITE PICTURE

(75) Inventor: Zbigniew Rybczynski, Cologne (DE)

(73) Assignee: Zbig Vision Gesellschaft für neue Bildgestaltung mbH (DE)

( * ) Notice: Subject to any disclaimer, the term of this patent is extended or adjusted under 35 U.S.C. 154(b) by 0 days.

(21) Appl. No.: 09/171,135

(22) PCT Filed: Apr. 30, 1997

(86) PCT No.: PCT/DE97/00893

§ 371 Date: Mar. 18, 1999

§ 102(e) Date: Mar. 18, 1999

(87) PCT Pub. No.: WO97/41693

PCT Pub. Date: Nov. 6, 1997

(30) Foreign Application Priority Data

Apr. 30, 1996 (DE) .......................................... 196 19 090

(51) Int. Cl.[7] .............................. H04N 9/74; H04N 9/75; H04N 9/76; G09G 5/00; G06T 15/60; G06T 11/80

(52) U.S. Cl. ........................ 348/584; 348/584; 348/586; 348/590; 348/591; 348/592; 348/599; 345/113; 345/114; 345/426; 345/435

(58) Field of Search .................................. 348/586, 590, 348/591, 592, 599, 584; 345/113, 114, 426, 435; 382/274; H04N 9/74, 9/75

(56) References Cited

U.S. PATENT DOCUMENTS

| | | | | |
|---|---|---|---|---|
| 4,100,569 A | | 7/1978 | Vlahos ......................... 358/22 |
| 4,344,085 A | | 8/1982 | Vlahos ......................... 358/22 |
| 4,589,013 A | | 5/1986 | Vlahos ......................... 358/22 |
| 4,625,231 A | | 11/1986 | Vlahos ......................... 358/22 |
| 5,003,491 A | * | 3/1991 | Heckt ......................... 364/518 |
| 5,027,213 A | * | 6/1991 | Kamin ......................... 358/183 |
| 5,343,252 A | | 8/1994 | Dadourian ................. 348/586 |
| 5,375,177 A | * | 12/1994 | Vaidyanathan et al. ....... 382/48 |
| 5,424,781 A | | 6/1995 | Vlahos ......................... 348/587 |
| 5,428,401 A | * | 6/1995 | Hinson ......................... 348/586 |
| 5,838,310 A | * | 11/1998 | Uya ............................. 345/186 |
| 5,870,103 A | * | 2/1999 | Luo ............................. 345/435 |
| 5,923,381 A | * | 7/1999 | Demay et al. .............. 348/592 |
| 5,982,350 A | * | 11/1999 | Hekmatpour et al. ....... 345/113 |
| 5,986,771 A | * | 11/1999 | Henderson et al. ......... 358/448 |
| 6,020,932 A | * | 2/2000 | Kurashige et al. .......... 348/584 |
| 6,122,013 A | * | 9/2000 | Tamir et al. ................ 348/587 |
| 6,141,063 A | * | 10/2000 | Gehrmann .................. 348/592 |
| 6,172,717 B1 | * | 1/2001 | Ebihara ....................... 348/586 |

* cited by examiner

Primary Examiner—Reinhard J. Eisenzopf
Assistant Examiner—Paulos M. Natnael
(74) Attorney, Agent, or Firm—Norris, McLaughlin & Marcus P.A.

(57) ABSTRACT

Apparatus for producing a composite image from a foreground image (FG), showing an object or a scene with a substantially monochrome background, and background image (BG) comprising a first processing unit (R4) for producing a control signal (SEP) for each pixel of the foregoing image (FG), reflecting whether an individual pixel of the foreground image is part of the object or part of the monochrome background, based both on the chromatic values of the pixel and on predetermined chromatic values, describing the color composition of the monochrome background, a selection unit (R5) suffixed to the first processing unit (R4), for calculating the chromatic values of an individual pixel of the composite image from, depending on the control signal (SEP), either the chromatic values of the corresponding pixel of the foreground image (FG) or the chromatic values of the corresponding pixel of the background image (BG), a second processing unit for calculating correction values for the chromatic values of an individual pixel of the composite image, based on the chromatic values of the corresponding pixel of the foreground image (FG) and/or of the background image (BG), in order to achieve a natural pictorial appearance, and an image processing unit suffixed to the second processing unit, for changing the chromatic values of an individual pixel of the composite image corresponding to the correction values, previously calculated by the second processing unit for this pixel.

15 Claims, 6 Drawing Sheets

Fig. 3d

DEVICE AND PROCESS FOR PRODUCING A COMPOSITE PICTURE

BACKGROUND OF THE INVENTION

1. Field of the Invention

The invention relates to an apparatus allowing the composition of two images according to the so-called "bluescreen" method.

2. Description of the Prior Art

As disclosed in U.S. Pat. No. 4,100,569, one of the two images—henceforth also called the foreground image—here shows an object or a three-dimensional scene with a substantially monochrome, preferably blue, background. The difference in color allows to separate the object or three-dimensional scene and the blue background.

The other image—henceforth also called the background image—on the other hand shows an arbitrary background into which the object or three-dimensional scene of the foreground image is to be transferred. This way it is possible to, for example, film a TV moderator with a blue background in a TV Studio, and to subsequently transfer this scene into an arbitrary setting, recorded previously as a separate image.

To this end, the known apparatus calculates two control parameters for each scanning point based on the chromatic values of the foreground image, wherein the first control parameter ("background control voltage") specifies how intensely the background image is to be shown in the resulting image—henceforth also called the composite image, whereas the second control parameter ("clamping voltage") specifies to which degree the color of the blue background must be attenuated in the composite image in order to suppress the unwelcome color contribution of the blue background.

The composite image is then combined by a TV mixer from the chromatic values of the background image weighted by the first control parameter on the one hand, and from the chromatic values of the foreground image on the other hand, wherein the blue color component of the foreground image is attenuated according to the second control parameter.

It is important in this context that the color components of the foreground image are taken into account in each scanning point in the mixing of the composite image. Thus, the foreground image is not subject to a switching process assembling the composite image of either the chromatic values of the foreground image or of the chromatic values of the background image. On the other hand, this allows to also reproduce semi-transparent objects in the foreground image, which in the composite image have the new background shine through instead of the blue background. On the other hand, this way the optical resolution of the foreground image is totally conserved.

The more recent U.S. Pat. Nos. 5,424,781; 5,343,252; 4,625,231; 4,589,013 and 4,344,085 describe sophistications of the method described above, wherein essentially the formulas for determining the two control parameters are modified by taking into account several correction factors. The object is to produce an optically satisfying composite image even for difficult color compositions of the foreground image.

The methods disclosed in the above documents thus allow the composition of two images to give composite image according to the "blue screen" method, however, especially for certain spectral compositions of the foreground image, they result in a composite image that appears optically unnatural. For professional use, e.g. to produce special effects in the film industry, this makes a costly manual touching up of the composite image necessary.

Additionally, the documents cited above, particularly U.S. Pat. No. 4,589,013, disclose the so-called "chroma-key" technique. This technique also renders the composition of two images to give a composite image. However, as opposed to the method described in the beginning, with the chromakey technique the individual scanning points in the composite image are composed either of the color components of the foreground image or of the color components of the background image. Thus, the foreground image is subject to a switching process. Because of the analog image encoding this results in an accordingly reduced optical resolution and complicates a reproduction of semi-transparent objects.

SUMMARY OF THE INVENTION

Accordingly, the object of the invention is to create an apparatus and/or a method to combine a foreground image and a background image to give a composite image with a natural optical appearance, wherein the foreground image pictures an object or a scene with a substantially monchrome background.

The invention is based upon the insight that the deterioration of the optical resolution, usually entailed by composing the composite image either of the pictorial content of the foreground image or of the pictorial content of the background image, no longer ensues, if the image processing is done digitally and if the separation of the foreground image into object on the one hand and monochrome background on the other hand is done for each pixel individually.

The present invention thus covers the art of providing both the foreground image and the background image in digital form, and of composing the composite image in each pixel either of the chromatic values of the corresponding pixel of the foreground image or of the chromatic values of the corresponding pixel of the background image, the composite image being subsequently processed by an image processing unit in order to reproduce e.g. transparency effects.

The term chromatic value as used here and below is to be interpreted broadly and just means that the pictorial appearance of a pixel can be calculated from its chromatic values (s). In the preferred embodiment of the invention, however, the chromatic values represent the intensity of the three primary colors red, green and blue, following the well known RGB color scheme. They are represented by numbers between 0 and 255, a high number standing for a high intensity of the corresponding color component.

Also the term monochrome background with which the object or scene in the foreground image is depicted is to be interpreted broadly. Monochrome does not imply each pixel in the region of the background has exclusively one color component, whereas the other two color components are zero. Decisive is rather the predominance of the intensity of one component—preferably blue—over the other two color components as well as that the color composition within the image region forming the background varies as little as possible.

A first processing unit subdivides the foreground image into object or scene and monochrome background. It calculates a control signal for each pixel, based both on the chromatic values of the foreground image and on predetermined chromatic values representing the color composition of the monochrome background. The control signal reflects whether a given pixel is part of the object and/or scene or part of the monochrome background.

A selection unit assembles the composite image. It calculates the chromatic values of each pixel, based on either the chromatic values of the corresponding pixel of the foreground image or on the chromatic values of the corresponding pixel of the background image.

When subdividing the object and/or scene and the background in the foreground image it is important that the predetermined chromatic values, representing the color composition of the monochrome background, reflect the actual color composition of the monochrome background as accurately as possible. However, this is difficult to accomplish since the foreground image often is available as a digitized photography only. Thus, the user has no information on the color composition of the monochrome background utilized in the photography.

In one embodiment of the invention it is therefore intended to establish the color composition of the monochrome background by calculating the average of the individual color components within the entire foreground image. The numbers thus calculated are in rather good agreement with the actual chromatic values of the monochrome background especially if the object or scene takes only little space in the foreground image, while the greater part of the foreground image is taken up by the monochrome background. However, because these average values always differ somewhat from the actual chromatic values of the monochrome background, according to one embodiment an input unit is provided via which the user, starting from the above average values, may change the predetermined chromatic values in order to achieve a better separation of object and/or scene and monochrome background.

In the preferred embodiment of the invention, the control signal, calculated by the first processing unit and allowing to distinguish in each pixel object and/or scene and monochrome background, is stored in a storage matrix. This allows to later process the composite image separately for object and/or scene and new background. Each element of the storage matrix is uniquely assigned to one pixel. For example, it would be set to "1" if the pixel is part of the monochrome background, and it would be set to "0", if the pixel depicts a part of the object or the scene.

According to the invention, after calculating the chromatic values of the individual pixels of the composite image, the composite image is processed further in order to achieve as natural a pictorial appearance of the composite image as possible. To this end, the apparatus comprises a second processing unit. This unit calculates correction values for each pixel of the composite image, based on the chromatic values of the corresponding pixel of the foreground image and/or on the chromatic values of the corresponding pixel of the background image. The actual processing is subsequently done by an image processing unit linked to the second processing unit. This image processing unit changes the chromatic values of the individual pixels of the composite image according to the correction values determined by the second processing unit, in order to obtain a natural pictorial appearance.

In an additional version of the invention, worth to be protected in its own right, it is intended to take into account the chromatic effect of the background image on the object or the scene. For example, if the object is transferred with unvaried color into a strongly reddish background image, it will appear unnatural in the new background because of the great contrast in color. Hence, in order to obtain a natural pictorial appearance it is of advantage to adapt the color composition of the object and/or the scene to the color composition of the background image. For the example described above where an object is transferred into a reddish background, this entails increasing the intensity of the red color component in the region of the image occupied by the object.

In this version of the invention the second processing unit determines correction values for each pixel of the composite image in that area of the image occupied by the object and/or the scene. The correction values reflect the chromatic effect of the background image on the object and/or the scene.

In a preferred embodiment of this version it is intended to store the correction values in a storage matrix. Each element of the storage matrix is uniquely assigned to one pixel of the composite image. By a separate pictorial representation of the contents of this storage matrix the user can get an overview of the chromatic effect of the background image on the transferred object, without examining the composite image in all detail.

Here, the correction values are preferably calculated considering the spatial distribution of color in the background image into which the object or the scene of the foreground image is transferred. For example if the object is placed in the middle of the background image, and the composite image is reddish on the right side, and more greenish on the left side, then in order to achieve a natural chromatic appearance of the object it makes sense to shift the color composition of the object towards red on the right side, and towards green on the left side.

To do so, the second processing unit subdivides the area of the composite image filled by the background image in a plurality of smaller image areas. For each of these areas it calculates representative chromatic values by, e.g., averaging the individual color components of all pixels in the respective image area. When calculating the correction values for an individual pixel, the chromatic effect of each image area is considered separately, the chromatic effect being weighted by the distance between the pixel and the image area considered. This means when calculating the correction value of a given pixel, a very distant pixel has little influence. On the other hand, pixel in the direct neighborhood has a relatively great influence on the chromatic effect of the pixel under consideration. Above procedure leads to a natural chromatic appearance of the object and/or the scene in the background image.

In an additional version of the invention, worth to be protected in its own right, it is intended to account for transparency effects in the calculation of the correction values for the composite image. Consider, e.g., a bottle of greenish glass to be transferred into a reddish background image. In the composite image, this bottle must be depicted with a slightly yellowish hue because of the reddish background shining through the bottle.

To take into account transparency effects it is therefore necessary to admix the background image to the composite image in the transparent image region.

It also is necessary to suppress the unwelcome color distortion caused by the monochrome background shining through the transparent object of the foreground image.

In this version of the invention the second processing unit therefore calculates for each pixel of the foreground image a transparency value based on its chromatic values reflecting the transparency of a given pixel. Here, one uses the fact that the color components of a transparent object are changed according to the color composition of the monochrome background.

The transparency value is subsequently fed to a TV-mixer. The mixer on the one hand adds the pictorial information of the background image to the composite image in the image region occupied by the transparent object or scene of the foreground image. On the other hand it suppresses the color distortion caused by the monochrome background. To do so, the color components of the composite image are diminished in the image region depicting a transparent object according to the color composition of the monochrome background.

In a preferred embodiment of this version the transparency value is stored in an extra storage matrix. By pictorially representing the contents of the storage matrix a fast survey of the influence of transparency effects is possible.

According to an additional version of the inventions, worth to be protected in its own right, it is intended to account for the shadow formation in the composite image caused by the object or the scene on the background image. Normally the object recorded with a monochrome background casts a shadow on the backing. This shadow is not reproduced accordingly in the composite image because of the separation of object on the one hand and monochrome background on the other hand.

In this version of the invention it is thus intended that a correction value is determined by the second processing unit for each pixel of the composite image in the area occupied by the background image, based on the chromatic values of the corresponding pixel in the foreground image. This correction value represents the effect of shadow formation in the composite image.

The correction value is subsequently fed to the image processing unit. To depict shadow formation, this unit darkens the composite image as a function of the correction value. In a preferred embodiment of this version an input unit is provided. This unit is linked to the image processing unit.

It allows the input of a control value which controls the harshness of the shadow formation in the composite image. This way the user can tune continuously the harshness of the shadows cast by the object or the scene on the background image in the composite image.

In an advantageous embodiment of this version it is intended to store the correction values reflecting the intensity of the shadow formation in a storage matrix. Each element of the storage matrix is uniquely assigned to one pixel of the composite image. By pictorially representing the contents of this storage matrix the user can survey the shadow distribution without depicting the composite image in all detail.

However, the object, when recorded with a monochrome background not only casts shadows on the background. It also produces illuminations due to reflections at the object surface. This effect must in particular be taken into account for shiny objects.

In a developed version of the invention, worth to be protected in its own right, it is thus intended to also account for reflections at the object or the scene in the composite image by brightening the composite image in appropriate areas.

To achieve this goal, the second processing unit determines for each pixel of the composite image in the image area occupied by the background image a correction value, based on the chromatic values of the corresponding pixels of the foreground image. This correction value reflects the illuminations of the monochrome background due to reflections at the object.

This correction value is subsequently fed to the image processing unit which brightens the composite image accordingly, depending on the correction value, in order to represent the illuminations. In the preferred embodiment of this version an input unit is provided, linked to the image processing unit, and allowing the input of a control value which controls the degree of illumination of the composite image. This way the user can control in the composite image the degree to which reflections at the object of the foreground image are to be reproduced in the composite image.

In one embodiment of this version it is intended to store the correction value describing the illuminations of the monochrome background of the foreground image due to reflections at the object in a storage matrix. Each element of the storage matrix is uniquely assigned to one pixel of the composite image. By pictorially representing the contents of this storage matrix the user can in a simple way get an overview of the illuminations due to reflections at the object of the foreground image, without depicting the composite image in all detail.

The above apparatus is particularly well suited for implementation in the context of a parallel computer architecture, because the chromatic values of the individual pixels of the composite image can be determined independently and thus in parallel.

However, the invention is not restricted to an implementation in the context of microprocessor systems in which the above described operations proceed controlled by a program. It may also be implemented by hardware only.

BRIEF DESCRIPTION OF THE DRAWINGS

Other advantageous embodiments of the invention are described in the dependent claims and/or are illustrated below together with the description of the preferred embodiment of the invention in the discussion of the figures.

Shown are in FIG. 1, as preferred embodiment of the invention, an apparatus for image compositing from a foreground image and a background image, in FIG. 2 a schematic overview of the operation of the apparatus depicted in FIG. 1, and in FIGS. 3a to 3d an additional method for image compositing from a foreground image and a background image according to the invention as a flow chart.

DESCRIPTION OF THE PREFERRED EMBODIMENTS

Figure 1:
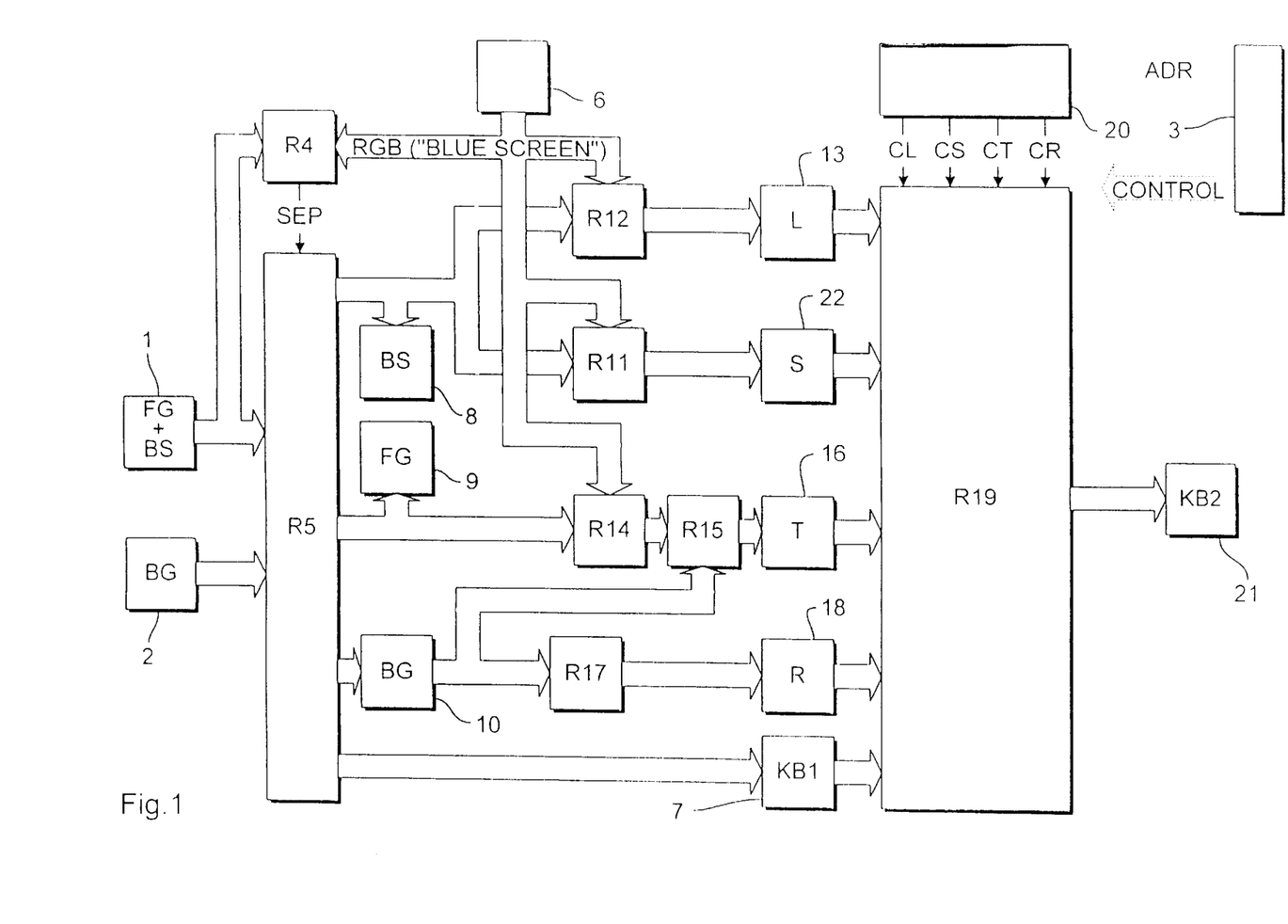

The apparatus shown in FIG. 1 as a block diagram serves to compose a foreground image (FG—foreground) and a background image (BG—background) to form a composite image, wherein the foreground image shows an object that is to be transferred into the background image.

It is prerequisite that the object in the foreground image be depicted with a substantially monochrome background (BS—blue screen). This way the object can be transferred into the background image separately, without the remainder of the foreground image.

To store the two images, the apparatus has two storage matrices 1, 2. Each element of the two storage matrices 1, 2 is uniquely assigned to one pixel of the foreground- and background image respectively and contains the intensities of the three primary colors red, green and blue in an interval between 0 and 255, according to the RGB color scheme. Thus the storage matrices 1, 2 represent a digital image of the foreground- and background image respectively.

In order to transfer the object depicted in the foreground image into the background image, one first needs to establish for each pixel whether that pixel is part of the object or whether it belongs to the monochrome background.

To do so, the control unit 3 consecutively addresses all elements of the storage matrix 1. The matrix thereupon sends via a data bus the chromatic values of the corresponding pixels of the foreground image to the processing unit R4, and to the selection unit R5.

The processing unit R4 produces for each pixel of the foreground image a control signal SEP. The signal reflects whether the pixel is part of the object (SEP=1) or part of the monochrome background (SEP=0). To this end, the processing unit R4 compares the chromatic values of each pixel read via the data bus from storage matrix 1 with predetermined chromatic values, which reflect the color composition of the monochrome background and which may be set by the user via an input unit 6. This provides the additional advantage that also such foreground images may be employed, for which the color composition of the monochrome background is not known exactly. In this case the user starts by setting an estimate for the color composition of the monochrome background at input unit 6 and then iteratively optimizes the estimate, using the optical quality of the image composition as a gauge.

The control signal SEP produced by the processing unit R4 is fed to the selection unit R5. The function of the latter is to separate the object and the monochrome background in the foreground image and to compose a composite image $KB_1$ consisting in each pixel either of the chromatic values of the corresponding pixel of the foreground image or of the chromatic values of the corresponding pixel of the background image. Another storage matrix 7 is suffixed to the selection unit R5 for buffering the composite image, each element of the storage matrix 7 being uniquely assigned to one pixel of the composite image, such that the storage matrix 7 represents a digital image of the composite image.

The selection unit R5 stores chromatic values read from storage matrix 2 in storage matrix 7, if the control signal SEP, produced by the processing unit R4, equals zero. Otherwise, if SEP=1, chromatic values read from storage matrix 1 are fed to the storage matrix 7.

The storage matrix 7 thus contains a digitally encoded composite image, which in each pixel is composed either of the corresponding pixel of the foreground image or of the corresponding pixel of the background image.

Additionally, three more storage matrices 8, 9, 10 are suffixed to selection unit R5. They allow a subsequent optical editing of the composite image buffered in the storage matrix. This allows for example to also reproduce transparency effects.

For example, storage matrix 8 contains a digitally encoded image of the monochrome background included in the foreground image. To this end, the selection unit reads the chromatic values of the corresponding pixel in the foreground image from storage matrix 1 and writes these chromatic values onto the corresponding elements of the storage matrix 8, if the control signal SEP indicates this pixel is part of the monochrome background because of its color composition. If on the other hand the pixel of the foreground image is part of the object pictured with the monochrome background, the selection unit sets the chromatic values of this pixel in the storage matrix 8 to zero, such that in these areas the image stored in matrix 8 is black.

The image of the monochrome background generated this way allows to reproduce shadows and illuminations caused by the object on the monochrome background when the foreground image was recorded. For example, a body recorded with a monochrome background normally casts a shadow on the backing. This shadow should appropriately be reproduced in the composite image. In the same way, reflections at the object surface cause illuminations of the monochrome background. These illuminations should also be reproduced as illuminations of the new background image in the composite image.

A processing unit R11 is therefore suffixed to the storage matrix 8. The function of this unit is to compare the color composition of each pixel of the monochrome background, previously cut out of the foreground image, and stored in the storage matrix 8, to the color composition set by the user via input unit 6. This predetermined color composition is the guiding figure describing the color composition of the monochrome background.

This way the processing unit R11 can recognize local modifications of the color composition or a darkening caused by shadows cast by the object recorded with the monochrome background. The processing unit R11 therefore calculates a correction value for each pixel in the image area filled by the monochrome background. This correction value indicates how intense the shadow formation is in a given pixel. The unit R11 stores these correction values in the storage matrix 22. This allows to account for shadow formation in the composite image.

While the processing unit R11 described above serves to account for the shadows cast by the object on the monochrome background, processing unit R12 allows to reproduce reflections at the object leading to local illuminations or modifications of the color composition in the region of the monochrome background. To this end, the processing unit R12 compares the chromatic values of the monochrome background which was previously cut out of the foreground image, to the predetermined guiding figures describing the color composition of the monochrome background, previously set by the user via the input unit 6. The processing unit R12 then calculates correction values for each pixel describing the change of the chromatic values of a given pixel by reflections at the object, and stores these correction values as a digitally encoded image in the storage matrix 13.

Moreover, the apparatus described here also allows to reproduce transparency effects by subsequent processing of the composite image buffered in the storage matrix. To this end, the selection unit R5 isolates the image region occupied by the object in the foreground image, and stores it in the storage matrix 9.

Subsequently processing unit R14 compares the color composition within the image region occupied by the object with the guiding figures describing the color composition of the monochrome background, previously set by the user via input unit 6. This way pixels are identified in which the object depicted in the foreground image is transparent, resulting in the monochrome background shining through the object. This shows in a modified color composition in this pixel. The processing unit R14 determines a transparency value for each pixel of the foreground image in the image area occupied by the object. This value reflects the transparency of the object in this pixel. The transparency value established this way is subsequently fed to an image processing unit R15. This unit calculates for each pixel the modification of the chromatic values resulting from the transparency of the object.

The image processing unit R15 on the one hand amends the discoloration in the foreground image caused by the monochrome background shining through the object. On the other hand the image processing unit R15 takes into account the pictorial effect of the new background shining through the object.

To do so, the unit R15 calculates correction values for each pixel of the composite image reflecting the modification of the chromatic values caused by the transparency effects.

Additionally, the apparatus allows to account for the effect of the new background image on the subjective color sensation. For example, if the new background image is strongly reddish, then the object contained in the foreground image appears unnatural, if it is reproduced in the composite image with its colors unvaried. To achieve a natural color sensation it is therefore necessary to adapt the chromatic values of the composite image to the chromatic values of the new background image in the image region occupied by the object.

To this end, a processing unit R17 is provided. This unit is suffixed to the storage matrix 10. It first subdivides the new background image in a plurality of smaller image sections. In each of these sections it averages the individual color components. Subsequently, processing unit R17 determines correction values for each pixel and for each of the three primary colors red, green and blue. These correction values prescribe the modification in color of the object necessary to achieve a natural chromatic impression. To do so, processing unit R17 first considers the effect of each image section individually and calculates a correction value for each section, depending on the distance between the pixel considered and the given section. For example, if a section is relatively distant to a given pixel of the object, then this section affects the color sensation of this pixel to a lesser degree than a closely neighbored section. The processing unit R17 subsequently sums for each pixel the correction values determined for the individual sections to obtain a single correction value. This value prescribes how the chromatic values of this pixel are to be changed in order to obtain a natural looking coloring with the new background image. These correction values are then written in the storage matrix 18.

Thus, the apparatus calculates from foreground- and background image the contents of four storage matrices 13, 16, 18, 22. Each matrix contains correction values for each pixel of the composite image and for each of the three primary colors red, green and blue. They serve to account for transparency effects, illuminations and shadows as well as the chromatic influence of the new background.

To this end, the apparatus presented here comprises an image processing unit R19. This unit is suffixed to the storage matrix 7 containing the composite image. It also is linked to the storage matrices 13, 16, 18, 22 containing the correction values. The image processing unit R19 then calculates for each pixel of the composite image $KB_1$ the chromatic values of a new image $KB_2$ based on the chromatic values of this pixel stored in the matrix 7 on the one hand and on the various correction values on the other hand. The new image $KB_2$ is stored in a suffixed storage matrix 21.

The image processing unit R19 hereby allows to continuously tune the intensities of the various effects described above. To this end, unit R19 has an input unit 20. The user may set various control parameters CL, CS, CT, CR via this input unit. The parameters serve as a weight for the correction values contained in the storage matrices 13, 16, 18, 22, allowing for example to continuously tune the shadow formation in the resulting image.

Figure 2:
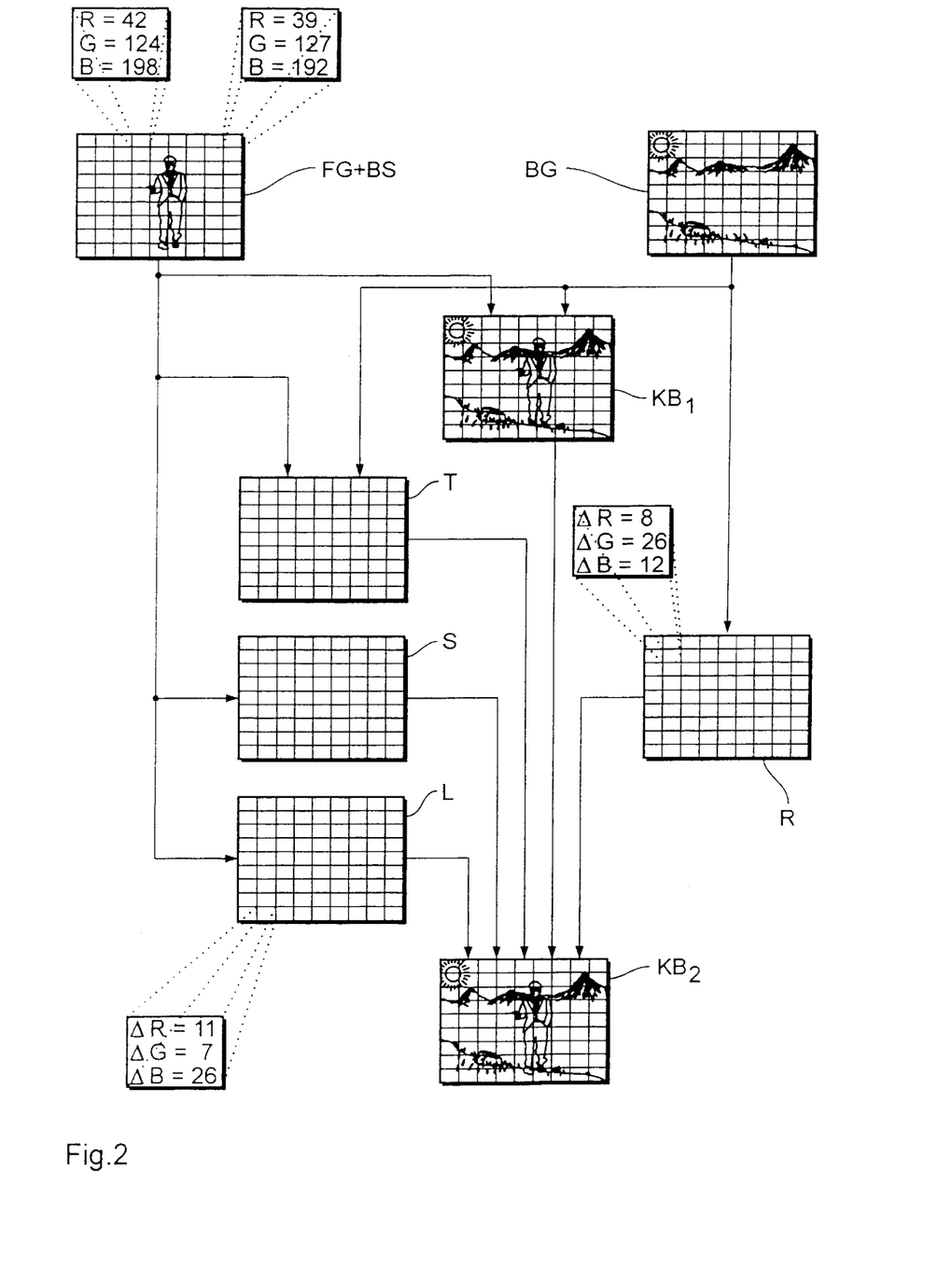

The operation of the above apparatus is clarified further in the diagram of FIG. 2.

To begin with, the apparatus calculates from the foreground image FG and the background image BG the composite image $KB_1$. The composite image $KB_1$ is composed in each pixel either of the chromatic values of the corresponding pixel of the foreground image FG or of the chromatic values of the corresponding pixel of the background image BG.

Then, the apparatus calculates four storage matrices T, S, L, R. These matrices contain correction values for each pixel of the composite image $KB_1$ and for each of the three primary colors red, green and blue. They allow to generate a composite image of natural pictorial appearance.

The correction values stored in storage matrix T reflect the modification of the chromatic values of the composite image resulting from the object contained in the foreground image being transparent, such that the background image BG is partly visible in this region also.

The storage matrix S on the other hand determines the modifications of the chromatic values of the composite image necessary to reproduce in the composite image, in the new background, the shadow cast by the object on the monochromatic backing of the foreground image.

Analogously, the storage matrix L allows to reproduce the illuminations visible on the monochrome background of the foreground image FG caused by reflections at the object.

The storage matrix R then serves to adapt to the new background the chromatic impression of the object in the composite image, such that the object does not appear unnatural in, e.g., a strongly reddish background.

The contents of the above storage matrices allow, together with the preliminary composite image $KB_1$, to calculate a final composite image $KB_2$. The final composite image is of natural pictorial appearance to the observer.

FIGS. 3a to 3d show an additional such matching method as a flow chart, wherein in the center of each figure the individual processing steps are shown, while the input data necessary for each processing step are depicted on the left-hand side, and the resulting output data are depicted on the right-hand side. The blocks shown on both sides of the processing steps each depict storage elements of a corresponding apparatus, which absorb the input- and/or output data of the corresponding processing steps, wherein some of the storage elements are realized as storage matrices, this being indicated by squares in the upper right corner of the corresponding blocks. Such storage elements thus contain a multitude of storage cells, each assigned to one pixel of the image area and determining, e.g., the intensity of the three primary colors red, green and blue.

Figure 3A:
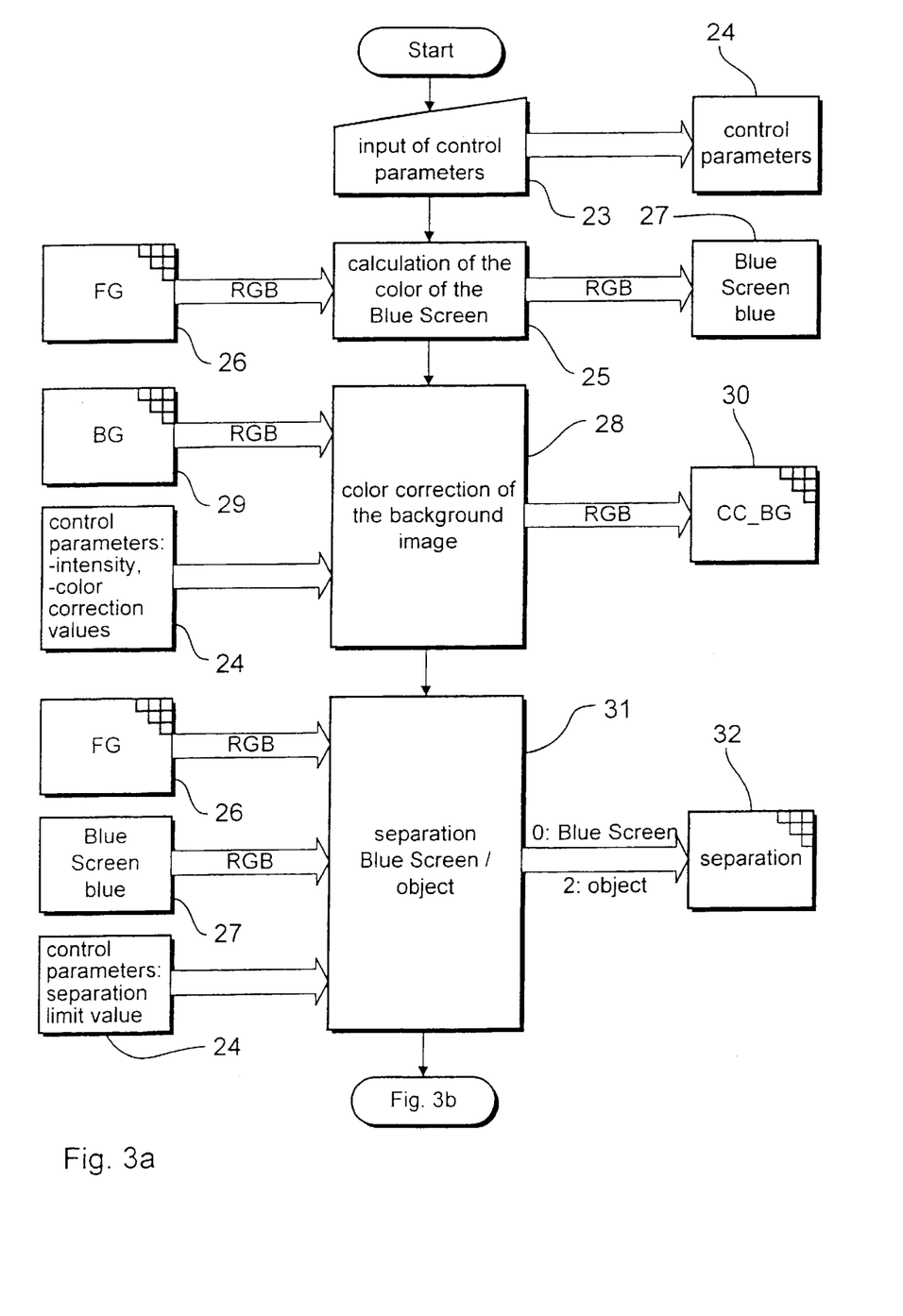

In the first processing step 23, the user at first feeds in control parameters via the input unit, the control parameter controlling the matching method and determining, e.g., to which degree transparency effects are accounted for in the resulting composite image. These control parameters are recorded in a storage element 24, and are retrieved as requested in the framework of the processing steps described below.

In the next processing step 25 at first the color composition of the blue background ("blue screen") in the foreground image (FG—foreground) is calculated, in order to later be able to separate in the foreground image the object or the scene and the blue background. To do so, the color components of the three primary colors red, green and blue for all pixels of the foreground image are read out of a storage matrix 26, this matrix containing the foreground image in digital form. Then, for all pixels of the foreground image, the intensity of the blue color component is compared to the intensity of the other two color components, in order to determine those pixels in the foreground image for which the blue color component is predominant, and which thus presumably are part of the blue background, rather than part of an object depicted in the foreground image. For the pixels determined that way, the average value of the three color components red, green and blue calculated, and is stored in a storage element 27 as a comparative figure to use in the later separation. This automatic determination of the color composition of the blue background also advantageously allows the use of foreground images for which the color composition of the blue background is unknown. Moreover, the color composition of the blue background may vary within relatively wide bounds without compromising the function, such that, e.g., the fading of an existing blue screen backdrop only has little effect on the resulting composite image.

In the next processing step 28, the color correction of the background image (BG—background) is carried out, according to the control parameters fed in previously and recorded in the storage element 24. To this end, first for all pixels of the background image the intensities of the three color components red, green and blue are read out, one after the other, from a storage matrix 29, which contains the background image in digital form.

The color correction of the background image on the one hand includes the tuning of the brightness while preserving the chromatic impression, by increasing or decreasing the intensity of the three color components of the individual pixels evenly, wherein the degree of brightening or darkening is prescribed by the control parameter "brightness". Here, it is important that the brightening or darkening is performed uniformly for all pixels of the background image.

On the other hand, the color correction of the background image also includes altering the color composition of the individual pixels, in order to achieve a different chromatic impression of the background image. To this end, the control parameters stored in the storage element 24 contain three color correction values for the three color components red, green and blue. The color composition of the background image is then altered in each pixel according to the color correction values; it should be noted that the change of color composition is performed uniformly for the entire background image.

The intensity values resulting from the color correction of the individual pixels for the three color components red, green and blue are then written into another storage matrix 30, this matrix thus containing the modified background image (CC-BG—color corrected background image).

In the next processing step 31, the separation of the blue background and the objects in the foreground image is carried out for each pixel of the foreground image individually. To this end, for each pixel of the foreground image the intensity values of the three color components are read out from storage matrix 26, and are compared to the color composition of the blue background, which was determined previously, and which is stored in the storage element 27. The comparison of the color composition of the blue background and the color composition of the individual pixels in the foreground image is carried out considering the control parameter "separation limit value" fed in previously during the first processing step 23, a parameter that may be varied by the user for optimizing the optical impression, particularly for adaptation to difficult image contents. In the context of this comparison, depending on whether the respective pixel is part of the blue background or part of an object of the foreground image, a key value is calculated and stored in a storage matrix 32, wherein each storage cell of the storage matrix 32 is assigned to one pixel of the foreground image. Thus, if a pixel of the foreground image is part of the blue background, a "0" is stored as key value in the corresponding storage cell of the storage matrix 32, whereas a pixel being part of an object of the foreground image leads to storing a "2" as key value. After the separation described above, the storage matrix 32 thus reflects whether an individual pixel of the foreground image is part of the blue background or part of an object of the foreground image.

Figure 3B:
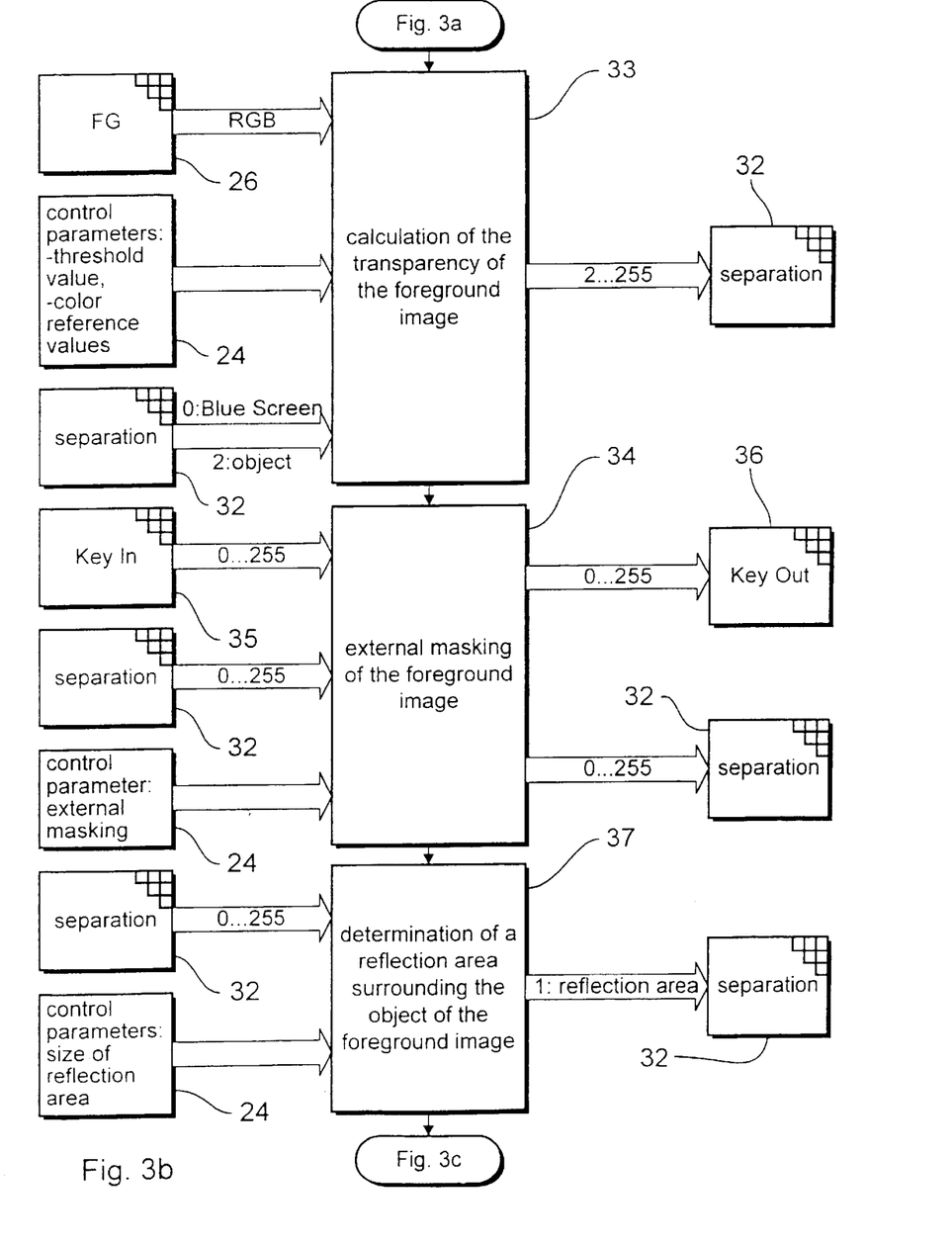

In the next processing step 33, the translucency of the objects of the foreground image is determined for each pixel individually, a feature manifesting itself in the blue background shining through. This allows for optimizing the pictorial impression of the resulting composite image by reproducing the translucency of the objects of the foreground image when inserting them into the background image by having the new background in the resulting composite image shine through the objects separated from the foreground image.

In order to save processing time, the transparency calculation is carried out only for those pixels of the foreground image that are not part of the blue background but part of an object of the foreground image, a feature that can be determined from the key values stored in the storage matrix 32.

To determine the translucency of the individual objects of the foreground image, the intensity values of the three color components for each pixel are read out from the storage matrix 26, and, taking into account a threshold value, which is read out as a control parameter from the storage element 24, they are compared to three color reference values, which also were fed in by the user during the first processing step 23, and which are recorded in storage element 24. In the context of this comparison, a transparency value in the range between 2 and 255 is calculated individually for each pixel, and is stored in the corresponding storage cell of the storage matrix 32, wherein the transparency value 2 denotes the object is completely non transparent in this pixel, while a transparency value of 255 occurs for an almost transparent object. After this processing step 33, the storage matrix 32 thus not only describes the affiliation of individual pixels with either the blue background or with an object, but additionally, for pixels affiliated with an object, it describes the translucency of the respective pixel.

In a further processing step 34 a masking of the image contents is performed, in order to, e.g., mask particular objects from the foreground image in the composite image. To do so, the key values stored in the storage matrix 32 for the individual pixels are changed according to the image masking envisaged, such image masking being prescribed by corresponding key values ("Key In") in another storage matrix 35. Each storage cell of this storage matrix 35 is assigned to one pixel of the image contents and contains a key value denoting whether an object of the foreground image in this pixel shall appear in the composite image or whether it shall not. Additionally, in this processing step 34, a set of key values ("Key Out") is calculated for the individual pixels, by linking the key values stored in the storage matrix 32 with the external key values ("Key In") prescribed by the storage matrix 35, wherein the type of linkage (e.g. addition or subtraction) is prescribed by the control parameter "external masking", which was fed in during the first processing step 23, and which is stored in the storage element 24. The key values calculated this way ("Key Out") are then stored in another storage matrix 36.

Figure 3C:
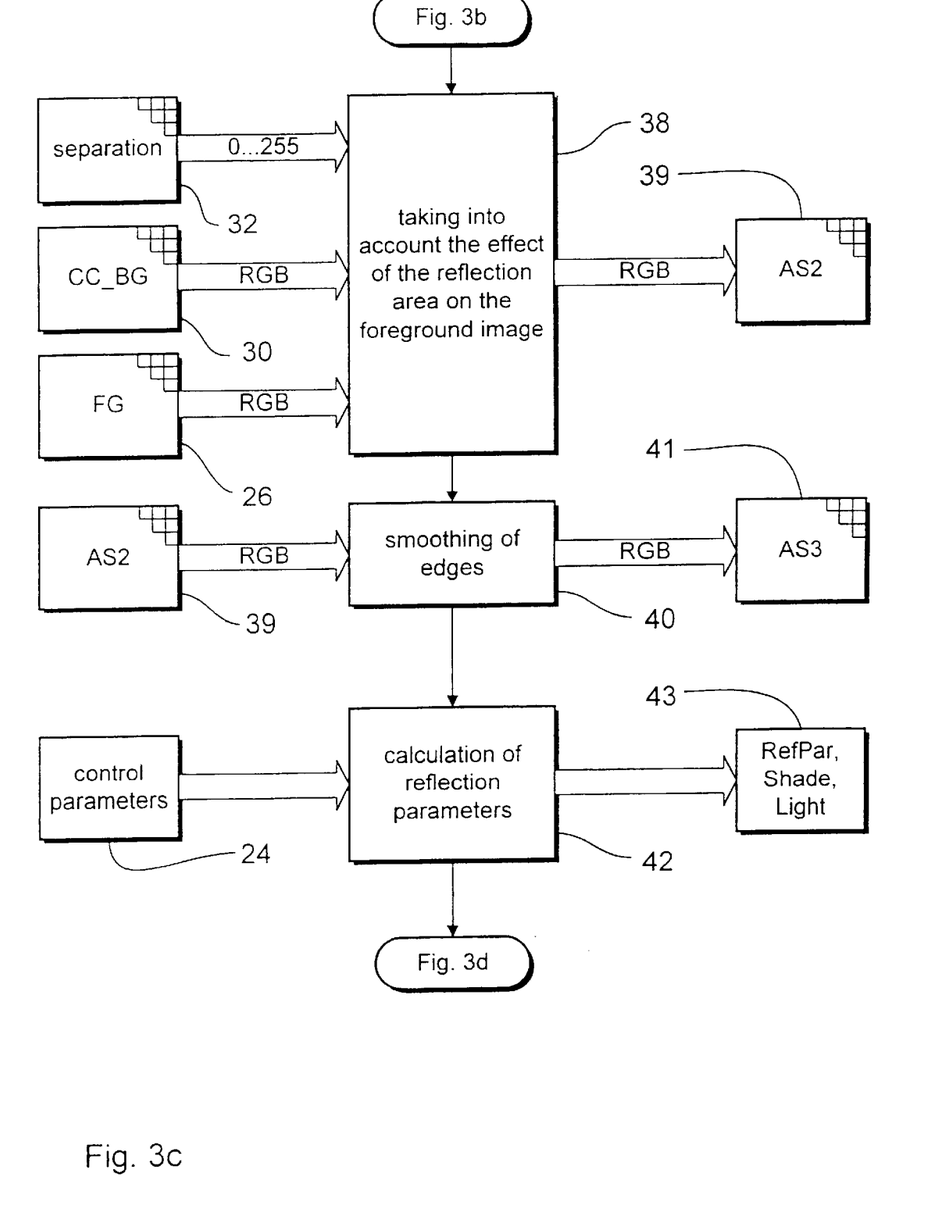

In the next processing step 37, a so-called reflection area is determined surrounding the objects in the foreground image, wherein the size of the reflection areas is determined by the control parameter "size of reflection area", which is stored in the storage element 24, and which was fed in previously by the user. This control parameter determines the width of the reflection area by indicating a particular number of pixels. To determine the reflection areas it is requisite to first determine the transitions between objects and the blue background in the foreground image, to which end the key values stored in the storage matrix 32 for the individual pixels are read out. For each pixel within the reflection areas the key value stored in the storage matrix 32 is set to the value "1" to mark the affiliation of the corresponding pixel with a reflection area.

In a next processing step 38, the influence of the pixels of the background image located in the reflection areas on the corresponding objects in the foreground image is calculated. Here, one acknowledges the fact that an object appears unnatural when transferred with its colors unvaried into, e.g., a strongly reddish background, so that it is advantageous to alter the color composition of the individual pixels of the objects of the foreground image transferred into the background image according to the color composition of the pixels located in the corresponding reflection areas, in order to achieve as natural a pictorial appearance as possible. To this end, the image area is subdivided into a plurality of rectangles, and for each rectangle an average value of the color composition of those pixels is determined, which are part of an object of the foreground image or of a reflection area. For each pixel affiliated with an object of the foreground image or with a reflection area a chromatic value is calculated, taking into account a possible transparency. These steps are carried out a number of times, wherein each time the size of the rectangles is divided in half until a prescribed minimal size is passed. A modified foreground image ("AS2") results, that takes into account the chromatic effect of the background image. It is stored in a storage matrix 39 for further processing.

In the next processing step 40, a smoothing of the edges in this modified foreground image ("AS2") is effected, by producing for the individual pixels an average value, averaged over the surrounding pixels. The resulting image ("AS3") is recorded in another storage matrix 41.

Figure 3D:
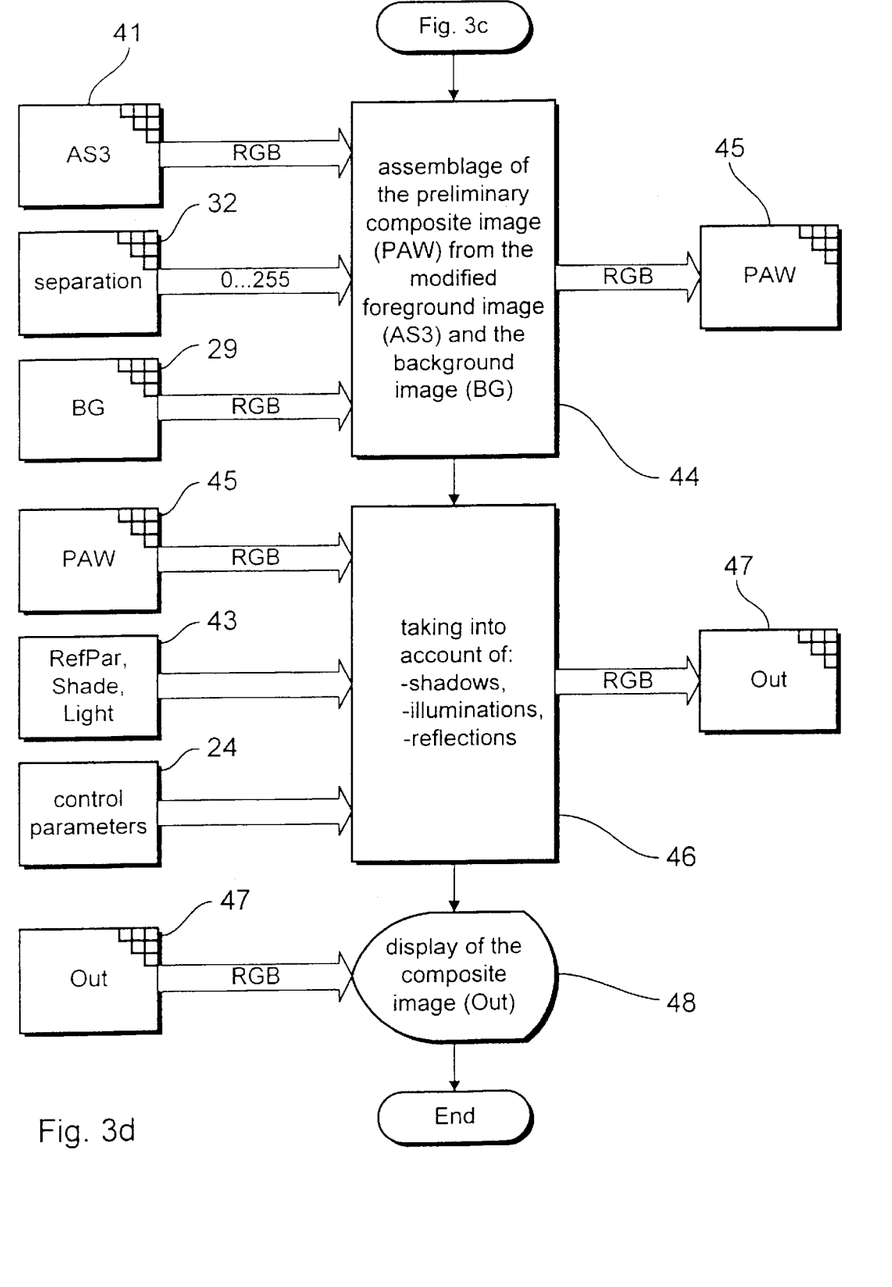

In preparation of the final assemblage of the composite image, in another processing step 42 a plurality of superimposition parameters is calculated and stored in a storage element 43, the calculation being performed as a function of the control parameters fed in during the first processing step 23 and recorded in storage element 24.

The assemblage of the composite image is carried out in the next processing step 44 form the modified foreground image ("AS3") and from the background image ("BG"), according to the key values stored in the storage matrix 32. This way a preliminary composite image ("PAW") results, which is buffered in a storage matrix 45, and which is subsequently processed to reproduce, e.g., transparency effects.

To this end, a further processing step 46 is intended, that modifies the color composition in the individual pixels of the preliminary composite image individually for each pixel, according to the superimposition parameters stored in the storage element 43 and according to the control values recorded in the storage element 24. The resulting composite image ("Out") is then stored in another storage matrix 47 and is finally produced as an output in the last processing step 48 via a display unit.

The invention is not limited in scope to the preferred embodiments described above. Rather, a multitude of versions is conceivable using the solution represented in fundamentally different embodiments.

In particular, the described solution lends itself to being implemented by means of software as well as hardware. In case of a software-controlled solution an existing processor within a computer system is used, the control program of which is the appropriate software, whereas in a hardware solution the necessary functions are provided by means of direct interconnection of logical elements. Additionally, mixed forms of these solutions may be advantageous.

What is claimed is:

1. Apparatus for producing a composite image from a foreground image (FG), showing an object or a scene with a substantially monochrome background, and a background image (BG) comprising a first processing unit (R4) for producing a control signal (SEP) for each pixel of the foreground image (FG), reflecting whether an individual pixel of the foreground image is part of the object or part of the monochrome background, based both on the chromatic values of the pixel and on predetermined chromatic values, describing the color composition of the monochrome background, a selection unit (R5) suffixed to the first processing unit (R4), for calculating the chromatic values of an individual pixel of the composite image from, depending on the control signal (SEP), either the chromatic values of the corresponding pixel of the foreground image (FG) or the chromatic values of the corresponding pixel of the background image (BG), a second processing unit (R11, R12, R14, R17) for calculating correction values for the chromatic values of an individual pixel of the composite image, based on the chromatic values of the corresponding pixel of the foreground image (FG) and/or of the background image (BG), in order to achieve a natural pictorial appearance, and an image processing unit (19) suffixed to the second processing unit (R11, R12, R14, R17), for changing the chromatic values of an individual pixel of the composite image corresponding to the correction values, previously calculated by the second processing unit (R11, R12, R14, R17) for this pixel.

2. Apparatus according to claim 1, wherein the first processing unit (R4) is linked to a first input unit (6) to set the predetermined chromatic values reflecting the color composition of the monochrome background of the foreground image (FG).

3. Apparatus according to claim 1, further comprising by an input device for loading the chromatic values of an individual pixel of the foreground image (FG) and of the background image (BG), and an output device for outputting the chromatic values of the corresponding pixel of the composite image ($KB_2$).

4. Apparatus according to claim 1, further comprising an input device for loading a first data record representing the foreground image (FG), whose elements each contain the chromatic values of an individual pixel of the foreground image, and a second data record representing the background image (BG), whose elements each contain the chromatic values of an individual pixel of the background image (BG), an output device for outputting a third data record representing the composite image ($KB_2$), whose elements each contain the chromatic values of an individual pixel of the composite image ($KB_2$).

5. Apparatus according to claim 4, further comprising a first storage matrix (1) for storing the first data record, and/or a second storage matrix (2) for storing the second data record, and/or a third storage matrix (21) for storing the third data record.

6. Apparatus according to claim 5, further comprising a third processing unit suffixed to the first storage matrix and prefixed to the first processing unit (R4), for calculating the predetermined chromatic values, which characterize the monochrome background of the foreground image (FG), as the average value of the chromatic values of the foreground image (FG).

7. Apparatus according to claim 5, wherein the second processing unit (R11, R12, R14, R17) is prefixed to a fourth storage matrix (18) for storing a fourth data record, wherein each element of the fourth data record contains the correction values for an individual pixel of the composite image, calculated by the second processing unit (R11, R12, R14, R17).

8. Apparatus according to claim 1, further comprising a second input unit (20) prefixed to the image processing unit (R19) for the input of weighting factors for the correction values calculated by the second processing unit (R11, R12, R14, R17.

9. Apparatus according to claim 1, wherein the primary colors are red, green and blue.

10. Apparatus according to claim 1, wherein the chromatic values are in the range between 0 and 255.

11. Method for producing a composite image from a foreground image (FG) showing an object with a substantially monochrome background and a background image (BG), comprising the steps of:

calculating a control signal (SEP) for each pixel of the foreground image (FG) based on both the chromatic values of a given pixel and on the predetermined chromatic values reflecting the color composition of the monochrome background, which indicates whether the pixel is part of the object or part of the monochrome background, calculating the chromatic values for each pixel of the composite image ($KB_1$) based on the chromatic values of the corresponding pixel either of the foreground image (FG) or of the background image (BG), depending on the control signal (SEP), calculating correction values for each pixel of the composite image ($KB_1$), based on the chromatic values of the corresponding pixel of the foreground image (FG) and/or of the background image (BG), and changing the chromatic values of the composite image ($KB_1$) in each pixel according to the correction values in order to achieve a natural pictorial appearance.

12. Method according to claim 11 further comprising calculating a transparency value for pixels depicting the object in the foreground image (FG), based on both the predetermined chromatic values characterizing the color composition of the monochrome background and on the chromatic values of the pixel, reflecting the transparency of the object in this pixel, calculating the correction values for pixels depicting the object in the composite image ($KB_1$) based on the chromatic values of the foreground image (FG) and of the background image (BG), depending on the transparency value.

13. Method according to claim 11 further comprising calculating a first luminosity value for pixels depicting the monochrome background in the foreground image (FG), describing the intensity of the shadows cast by the object on the monochrome background, based both on the chromatic values characterizing the color composition of the monochrome background on the chromatic values of the pixel, calculating the correction values for pixels of the composite image depicting the background image (BG) in order to reconstruct the shadows cast by the object on the background image (BG), based on the first luminosity value.

14. Method according to claim 11, further comprising calculating a second luminosity value for pixels depicting the monochrome background in the foreground image (FG), describing the intensity of the illuminations on the monochrome background caused by reflections at the object, based on both the chromatic values characterizing the color composition of the monochrome background and on the chromatic values of the pixel, calculating the correction values to reproduce reflections in the composite image for pixels of the composite image depicting the background image (BG) based on the second luminosity value.

15. Method according to claim 11, further comprising subdividing the background image (BG) in a plurality of sections and for each section calculating the average values of the chromatic values of the individual pixels, calculating the correction values for pixels depicting the object in the composite image based on the average values of all sections.

* * * * *